Oct. 27, 1970 G. GUANELLA 3,537,007

DISTORTION COMPENSATING SYSTEM FOR USE IN PULSE SIGNAL TRANSMISSION

Filed Sept. 19, 1967 3 Sheets-Sheet 1

INVENTOR
GUSTAV GUANELLA
BY
KARL RATH
ATTORNEY

INVENTOR
GUSTAV GUANELLA
BY
KARL RATH
ATTORNEY

INVENTOR
GUSTAV GUANELLA
BY
KARL RATH
ATTORNEY 3,537,007

DISTORTION COMPENSATING SYSTEM FOR USE IN PULSE SIGNAL TRANSMISSION

Gustav Guanella, Zurich, Switzerland, assignor to "Patelhold" Patentverwertungs- & Elektro-Holding A.G., Glarus, Switzerland Continuation-in-part of application Ser. No. 339,946, Jan. 24, 1964. This application Sept. 19, 1967, Ser. No. 668,882
Claims priority, application Switzerland, Jan. 30, 1963, 1,166/63
Int. Cl. H04b *15/00*
U.S. Cl. 325—42 5 Claims

ABSTRACT OF THE DISCLOSURE

In a pulse signal transmission system utilizing signal pulses with the center lines of the pulses being spaced by constant time intervals, distortion due to dispersion or widening of the pulses caused by linear (i.e. frequency and/or phase) distortion is effectively compensated by means of a compensating delay device or net work having an input coupling point connected to a point of said system, this forming substantially the sole connection of said device with said system, and a plurality of output coupling points, the differences in transit time in the delay device for the signals between adjacnt coupling points being equal to the time interval between the center lines of the signal pulses. A plurality of external feedback paths are arranged to feed back, over individual unilateral attenuators and polarity adjusting devices, signals from each of said output coupling points directly to said input coupling point, to thereby cause the compensated signal at said input coupling point to be the sum of the input and feedback signals and to cause the latter to be derived from the compensated signals, respectively. There is obtained in this manner a substantial compensation of the disturbing pulses interfering with the main or useful signal pulses by means of a limited number of coupling points of the compensator or delay device substantially equal to the number of delayed disturbing pulses produced by each signal pulse to be corrected or eliminated.

The present application is a continuation-in-part of application Ser. No. 339,946, filed Jan. 24, 1964, entitled Distortion Compensation In Pulse Signal Tranmission, and now abandoned.

The present invention relates to signal transmission by means of pulse trains having constant time intervals between the center lines of succeeding pulses, more particularly to improved means for the reduction or prevention of distortion caused by the pulses interfering with each other due to dispersion or widening thereof as a result of frequency and/or phase distortion produced by the transmission line or link.

It is well known that frequency and/or phase distortion occurs during the transmission of pulse signals of this type, such distortion being particularly troublesome where the transmitted pulses are modulated by individual or uncorrelated signals, such as in the case of multiplex time-division pulse transmission, pulse amplitude, pulse position or pulse code-modulated transmission systems and the like.

Although a considerable amount of frequency-dependent phase variations are generally permissible in the transmission of speech and the like signals, distortion compensation is of substantial advantage when continuously variable signals are being transmitted.

In order to compensate for the type of distortion referred to, it is already known to simulate a faulty transmission system by a passive delay device or simulation designed to deliver distorted output signals which are substantially identical to those delivered by the transmission line to be corrected, and to provied a compensating system similar to said simulation and which, when embodied in a receiver connected to the end of the line, serves to compensate or reduce the distortion.

Such a distortion compensating system especially adapted to cross-talk elemination in a pulse multiplex signal transmission system is shown by and described in applicant's U.S. Pat. Nos. 2,580,421 and 2,681,384, wherein the distorted signals are fed from an input point of a transmission line to an artificial delay line comprising a plurality of output or coupling points connected to and combined at an output point of said transmission line. The signals are taken from a plurality of output coupling points of the delay line via adjustable attenuators or amplitude regulators and fed to the common output point of the transmission line. The same effect may be achieved if the received distorted signals are fed, via the adjustable attenuators, to a plurailty of input coupling points on the delay line from the output of which are derived the signals for correcting the distortion. In either case, the compensating signals are derived from one point of the transmission line and applied to a different point of said line for effecting the distortion compensation or correction.

It has been found, however, that a great expenditure of parts or delay circuits is involved in systems of the foregoing type, to ensure full an deffective distortion compensation even in the case of relatively easily and simply simulable transmission links or lines. For example, if the transmission system can be simulated by a delay line having say three output coupling points from which the delayed distorting signals are derived via attenuators having a control range of say between $-1$ and $+1$, a delay line compensator with a considerably greater number of coupling points or delay circuits and associated adjustable amplitude regulators or attenuators must be provided in order to fully compensate for the distortion at a receiver, due to the fact that the distorting pulses in turn produce, as an after effect, additional distortion by the function of the delay line of the compensator, which additional distortion has to be compensated in turn by further delay networks or coupling points. Thus if, in the example mentioned of a simulation by a delay line with three output stages or coupling points, the amplitudes at these points amount to 1, 0.5 and $-0.2$, respectively, it is found that in the compensator delay line provided at the receiver the seventh coupling point still involves an amplitude of the distorting pulse of more than 0.1 of the original or main signal pulse. In other words, the progressive cancellation process of the distorting pulses by the successive stages of the delay line converges only slowly to zero as the number of delay networks or coupling points is increased. For complete elimination of the distortion or interference to absolute zero, an infinite number of delay networks or coupling points on the delay line and associated attenuators would be required.

The foregoing disadvantage of a large number of stages or coupling points of the delay device of the compensator is accompanied by further substantial difficulties in effecting the adjustment of the numerous attenuators, since a number of factors must be readjusted in the compensating device whenever the adjustment of one of the attenuators is changed.

Accordingly, an important object of the present invention is the provision of an improved distortion compensating system of the referred to type, suitable especially for the compensation of frequency and/or phase distortion, in a pulse signal transmission system utilizing pulses spaced by constant time intervals between their center lines, which improved system is substantially devoid of the drawbacks and difficulties inherent in the previously known distortion compensators, and which system is extremely simple in design as well as efficient and reliable in operation.

A more specific object of the invention is the provision of a pulse distortion compensating system of the referred to type which, while insuring an effective and reliable compensation or reduction of the undesirable disturbing pulses caused by frequency and/or phase distortion, does not require a delay device having a number of stages or coupling points greater than the number of stages required for the simulation of the transmission system responsible for or causing the distortion to be reduced or eliminated.

The invention, both as to the foregoing and ancillary objects as well as novel aspects thereof, will be better understood from the following detailed description of a few practical embodiments, taken in conjunction with the accompanying drawings forming part of this specification and in which.

Like reference characters denote like parts and magnitudes throughout the different views of the drawings.

With the foregoing objects in view, the invention involves generally the provision of an improved time delay device in a distortion compensating system of the referred to type, embodying a plurality of external return or feedback circuits associated with separate coupling points of said device, each of said circuits including an amplitude regulator and polarity adjusting device designed and adjusted, to enable a distortion compensation by the use of a minimum number of circuit elements or coupling points of said device, or not exceeding the coupling points required for the corresponding simulation for producing the disturbing signals of the transmission line to be corrected or compensated, in a manner as will become further apparent as the description proceeds in reference to the drawings.

Figure 1:
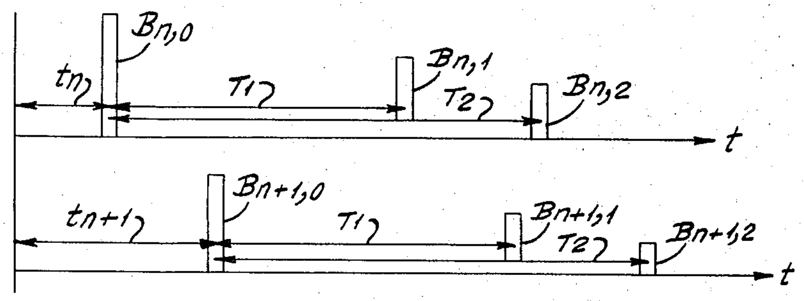
FIG. 1 is a diagram showing, by way of example and in reference to a pair of transmitted pulse signals, delayed or disturbing signals to be reduced or compensated.

FIG. 1 shows, by way of example, two communication pulses $B_{n,0}$ and $B_{n+1,0}$ received at the output end of a pulse signal transmission line and plotted along the time axis $t$. The pulse $B_{n,0}$, which is assumed to correspond to an original signal pulse $A_n$ sent out from the transmitting end of said line, arrives at the instant $tn$. Besides this useful pulse, the undesired distorting pulses $B_{n,1}$ and $B_{n,2}$, for example, appear at the receiving end with additional time delay of $T_1$ and $T_2$, respectively. In the same way, the signal pulse $B_{n+1,0}$, corresponding to the succeeding signal pulse $A_{n+1}$ arriving the transmitting end of the line, appears at the receiving end at the instant $tn+1$. This pulse is also followed by undesired disturbing pulses $B_{n+1,1}$ and $B_{n+1,2}$ having time delays of $T_1$ and $T_2$, respectively. For the sake of greater clarity, the latter pulses are shown below the first pulses on a second time axis.

While FIG. 1 and the following figures illustrate the general condition of the main signal and disturbing pulses having different mutual time delays $T_1$ and $T_2$, the same considerations as presented in the following apply to a signal pulse train with the spacing intervals between the center lines of succeeding pulses having a constant value and with the disturbing pulses or components coinciding or interfering with the main signal pulses, as shown by and described hereafter in reference to FIG. 7 of the drawings.

The amplitudes of the undesired or disturbing pulses, FIG. 1, are in each case proportional to the amplitude of the useful or signal pulses, that is:

$$B_{n,1}=p_1B_{n,0}=p_1A_n$$

and $$B_{n,2}=p_2B_{2,0}=p_2A_n$$

wherein $p_1$ and $p_2$ are proportionality factors or constants.

Figure 2:
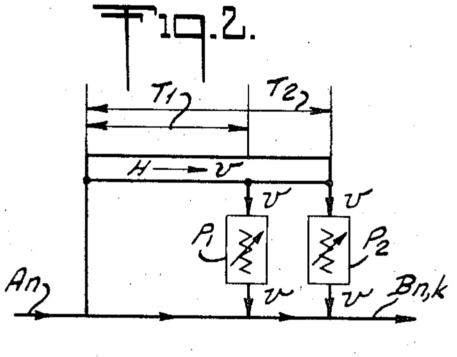
FIG. 2 shows, in block diagram form, a substitute network or simulation for the production of disturbing signals according to FIG. 1.

The transmission system producing the distorted signals according to FIG. 1 may be replaced by a simulation or substituted network as shown in FIG. 2. In the latter, the undistorted pulses $A_n$ are fed to a delay line H and the pulses are again taken from this line, after being delayed by time intervals $T_1$ and $T_2$ via adjustable amplitude regulators or attenuators $P_1$ and $P_2$ having attenuating factors $p_1$ and $p_2$, respectively, and fed together with the undelayed pulses $A_n$ to the output of the simulation. As a consequence, a pulse train $B_{n,k}$, consisting of the original pulses $B_{n,o}=A_n$, the disturbing pulses $B_{n,1}$ with an amplitude of $p_1A_k$ and being delayed by $T_1$, and the pulses $B_{n,2}$ with an amplitude of $p_2A_n$ and being delayed by $T_2$, now appears at the output of the device or simulation according to FIG. 2. In other words, the delay circuit of FIG. 2 simulates a transmission system or line resulting in the received main signal and disturbing pulses according to FIG. 1.

Figure 3:
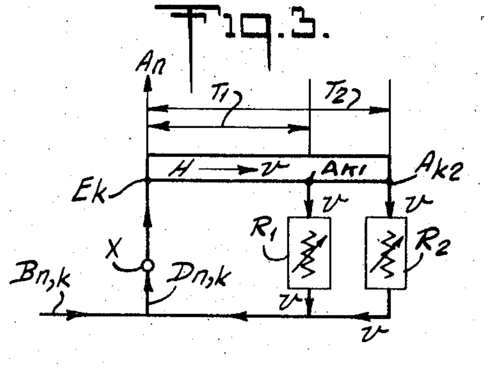
FIG. 3 shows, in block diagram form, an example of embodiment of a distortion compensating system according to the invention, suitable for use in connection with a transmitting system simulated by FIG. 2.

In the device shown in FIG. 3 representing the improved distortion compensator according to the invention, the pulses $B_{n,k}$ supplied by the transmission system are fed to the input coupling point $E_K$ of the delay line or device H of the compensator which comprises two output coupling points $A_{K1}$ and $A_{K2}$ arranged in the same manner as in the simulation shown in FIG. 2. The pulses delayed by intervals $T_1$ and $T_2$ and taken from the coupling points $A_{K1}$ and $A_{K2}$ are returned, via adjustable attenuators and polarity adjusting devices $R_1$ and $R_2$, respectively, to the input of the device, where they are combined by summation with the input pulses $B_{n,k}$. This return or feedback of the delayed pulses results in a complete compensation of the distortion, without requiring a delay line or device of a dimension in excess of the delay device of the simulation of FIG. 2. In other words, only the original undistorted signal pulses $A_n$ will appear on the output line of the transmission system connected to the input point $E_K$ of the delay device H, provided a proper adjustment of the attenuating factors $r_1$ and $r_2$ of the regulators $R_1$ and $R_2$, respectively.

Figures 7, 8, 9:
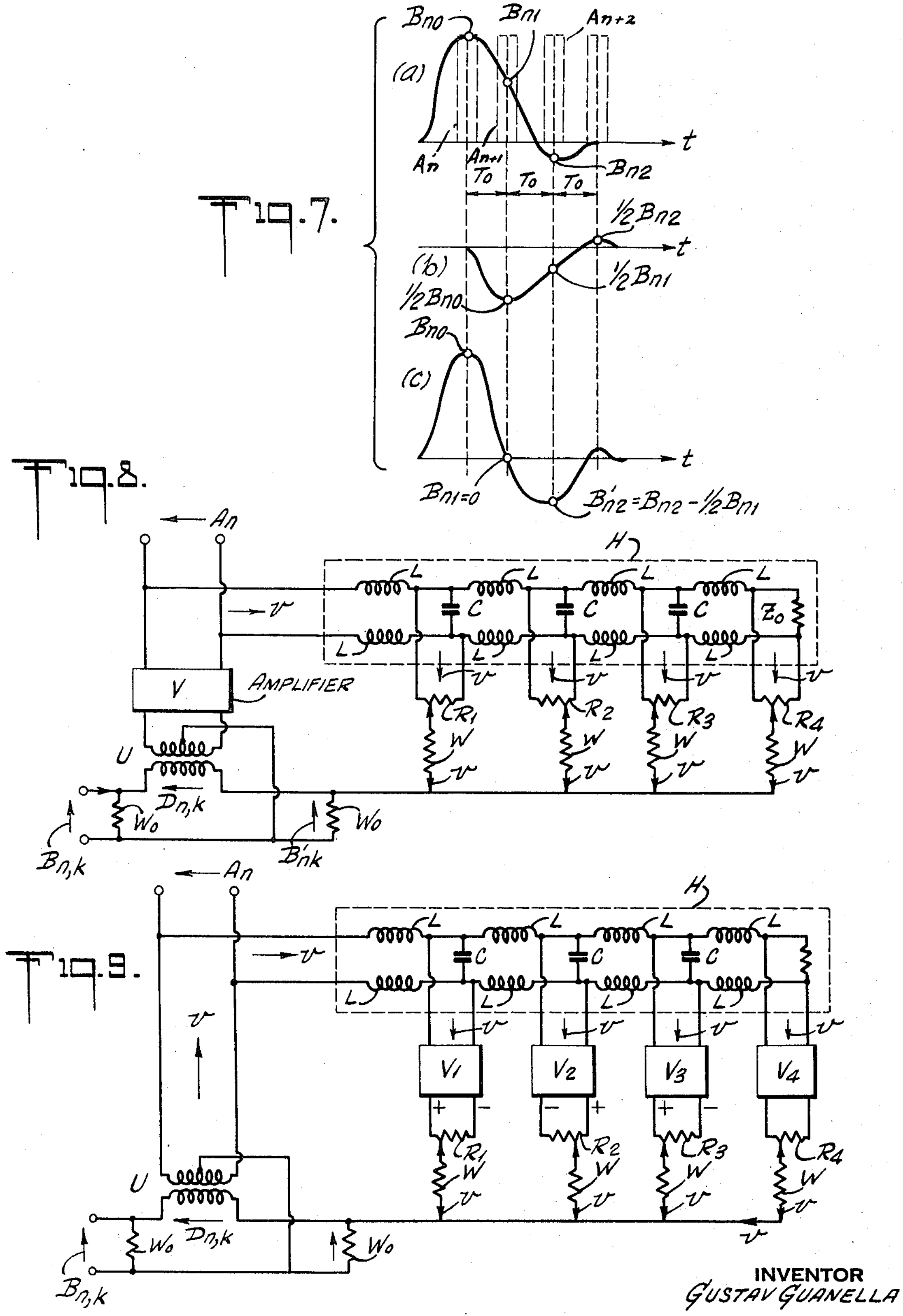
FIG. 7 is a set of theoretical diagrams further explanatory of the underlying principles and function of the invention.
FIG. 8 shows in greater detail a wiring diagram of a practical distortion compensating system according to the invention of the type shown by FIG. 3.
FIG. 9 shows a modification of the system according to FIG. 8.

In both FIG. 2 and FIG. 3, the unilateral energy flows are indicated by the arrows $v$, while other details will become further apparent from the description of FIGS. 8 and 9.

Figure 4:
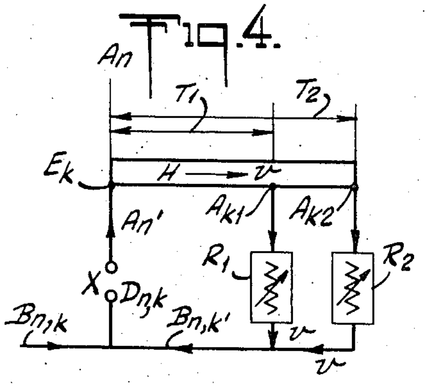
FIG. 4 shows the same device in a modified form for purposes of explanation of the function and operation of the invention.

For the purpose of further explanation, the line leading from a point of the transmission system to the input point $E_K$ of the delay device H, FIG. 3, is assumed temporarily to be severed at the point X, in the manner more clearly shown in FIG. 4. Under the further assumption that a pulse $A_n'$ is fed to the delay device H, the pulses $B_{n,K}=r_k.A_n'$ will now appear on the return line in accordance with the attenuation factors $r_k$ to which the amplitude regulators R$k$ have been adjusted, where $k=1$ and 2 in the example shown. The input pulses $B_{n,k}$ supplied by the transmission system and the returned pulses $B_{n,k}'$ are summed before the severance point X to give the pulses $D_{n,k}$.

It is now required that the pulses $A_n'$ present at the input coupling point $E_K$ and representing the output pulses of the device, be identical with the original undistorted communication pulses $A_n$, i.e. $A_n=A_n$. Let it furthermore be assumed that the attenuation factors $r_1$ and $r_2$ are identical, with opposite signs, to the corresponding factors $p_1$ and $p_2$ of the simulation shown in FIG. 2, i.e. $r_k=p_k$. As a consequence, referring to the pulses present before the severance point $x$, $D_{n,k}=0$ when $k=1$ and 2, and $D_{n,k}=A_n$ when $k=0$. Thus, the identical pulses $A_n=A_n'$ are in fact present on both sides of the severance point $x$, so that the latter may be closed, provided that $r_1=-p_1$ and $r_2=-p_2$ and that the delay times $T_1$ and $T_2$ correspond to those of the simulation of FIG. 2, that is to the difference between the transmission transit times of the input pulses.

Figure 5:
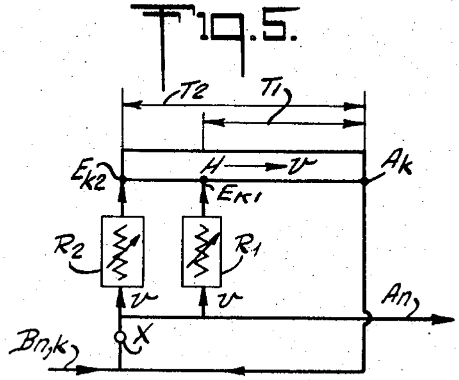
FIG. 5 shows an alternative arrangement of the distortion compensating system according to FIG. 3.

The same result can be attained with a device as shown in FIG. 5, wherein the sum of the input signal and the signal taken from the output coupling point on the delay device is fed via adjustable amplitude-regulators to a plurality of input coupling points. The delay device, being again designated by H, comprises two input coupling points $E_{K1}$ and $E_{K2}$ and one output coupling point $A_K$. The pulses taken from the delay device at the point $A_K$ are added to the input pulses $B_{n,k}$ and passed via the adjustable amplitude-regulators $R_1$ and $R_2$ to the coupling points $E_{K1}$ and $E_{K2}$. The considerations with reference to the devices shown in FIG. 3 and 4 regarding the delay times $T_1$ and $T_2$ and regarding adjustment of the amplitude-regulators and polarity adjusting devices $R_1$ and $R_2$ apply in an analogous manner to the device shown in FIG. 5.

According to the nature of the transmission system, the number of output coupling points or input coupling points on the delay device may be greater than in the case of the examples of embodiment shown in FIGS. 3 and 5, depending upon exising dispersion conditions of the pulses to be corrected.

Figure 6:
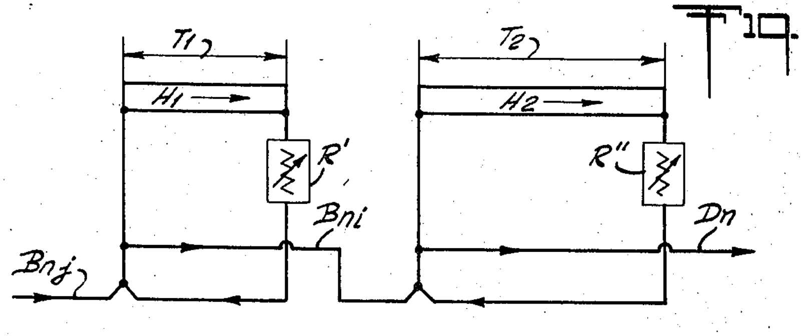
FIG. 6 shows an arrangement comprising two compensating systems according to the preceding figures in cascade.

Compensation for distortion may advantageously also take place with a cascade circuit comprising a plurality of delay devices each comprising a return path in accordance with the invention. FIG. 6 shows as an example a cascade circuit comprising two compensating devices, each comprising a delay device $H_1$ or $H_2$ with one input coupling point and one output coupling point in each case with, for example, differing transit-time delays $T_1$ and $T_2$. Such a cascade circuit is suitable for compensating for distorting in transmission systems made up of, for example, two portions, which systems can be simulated by a corresponding cascade circuit comprising two delay lines with differing transit times.

In each compensating device according to FIG. 6, the pulses coupled out from the delay devices are returned to the input via adjustable amplitude-regulators and polarity control devices R′ and R″ having attenuation factors of $r'$ and $r''$, respectively, summed with the input pulses and fed to the input coupling point of the delay device, $r'$ and $r''$ corresponding with opposite signs to the attenuation factors of the corresponding simulation. In this case, the distorted received pulses $B_{nj}$ are fed to the first compensating device, and the output pulses $B_{nl}$ of the first compensating device are fed to the input of the second compensating device. As a consequence, the interfering pulses produced by the line are no longer present in the train of output pulses $D_n$ taken from the second compensating device.

The function of the invention in effecting distortion elimination, in a pulse signal ransmission system with the center lines of succeeding pulse spaced by constant intervals, by means of a compensating delay line or the like device having a number of output or coupling points not exceeding the number of coupling points necessary to simulate the transmission line or link producing the distortion to be eliminated, will be further understood from the following more detailed explanation in reference to FIG. 7.

The reason why an excess number of delay networks or coupling points are required in the previously known distortion compensating systems, is predicated upon the fact that, in the arrangement of the type under discussion the compensation of one disturbing pulse produces, as an after effect, a new pulse or pulses which must in turn be compensated. Thus, let it be assumed, for the purpose of this discussion, that the distortion transmission line or link, supplying equi-spaced input pulses $A_n$, $A_{n+1}$, $A_{n+2}$ . . . , may be simulated by a delay line H, according to FIG. 2, having two coupling points and equal delay times $T_1=T_2=T_0$, FIG. 7, corresponding to the time spacing intervals between the center lines of succeeding pulses. As a consequence, an original undistorted signal pulse $A_n$ may result, by way of example, in a receiving pulse $B_{n0}$, FIG. 7$a$, being followed, at intervals $T_0$, by two disturbing pulses $B_{n1}=\frac{1}{2}B_{n0}$ and $B_{n2}=-\frac{1}{2}B_{n1}$. In order to eliminate $B_{n1}$, a compensating signal or pulse $-\frac{1}{2}B_{n0}$ is formed by the delay line H at the receiver, as shown by FIG. 7$b$, by time delay, amplitude reduction and polarity reversal, in the manner described hereinbefore. By the additive combination of the signals according to FIGS. 7$a$ and 7$b$, there is obtained a signal as shown by FIG. 7$c$, wherein the disturbing signal $B_{n1}$ has been cancelled out. However, there has now been produced, by the line H acting as a distorting means the same as in the corresponding simulation, a new distorting signal, $B'_{n2}=B_{n2}-\frac{1}{2}B_{n1}$, having a greater amplitude than the original distorting signal $B_{n2}$. The latter is compensated in the same manner as the original signal $B_{n1}$ with this result that there will be now a third distorting or rest pulse of increased magnitude, and so on and so forth. As a consequence, the compensation of each disturbing pulse leads to the production of further distortion which must be cancelled out by the next following link or links of the delay line until it assumes a negligibly small value or the cancellation process converges towards zero after a sufficient number of sequential compensations. As a consequence, the known compensating system requires a delay line having a length or number of coupling points or stages considerably in excess of the length of the line or number of coupling stages required for the simulation of the transmission link or line producing the distortion to be eliminated.

On the other hand, by the use of a simple delay line or the like device not exceeding the dimensions required for simulation of the original transmission link and return feed arrangement according to the present invention, the effect is obtained of a line having a considerable or practically infinite number of coupling points or return paths, in such a manner as to result in an effective and reliable distortion compensation by the use of a minimum of parts, as well as adjustments required.

Referring to the wiring diagram of FIG. 8, there is shown in greater detail a distortion compensating system of the type according to FIG. 3, utilizing a symmetrical delay line or network H comprised of a series inductors L and parallel capacitors C. In order to prevent undesirable reflections, the line is terminated by a resistance $Z_0$ equal to the wave resistance of the line. The delayed signals are derived via adjustable attenuators $R_1$, $R_2$ . . . having a resistance which is high compared with the wave resistance of the line. In order further to avoid undesirable coupling effects between the potentiometers $R_1$, $R_2$ . . . , high-ohmic series or decoupling resistors W are inserted in the coupling or compensating paths. The signal voltage $D_{nk}$ applied to the primary of the input transformer U corresponds to the difference between the input signal voltage $B_{n,k}$ and the feedback voltage $B_{n,k}$. The output voltage of the transformer U is applied to an amplifier V which serves to compensate for the reduction of the signals by the decoupling resistors W and is so adjusted that a feedback signal derived from the delay line in the extreme position of the respective potentiometer will appear with equal amplitude at the input of the line. Provided a proper adjustment of the attenuator or potentiometers $R_1$, $R_2$ . . . , substantially distortion-free output signals $A_n$ will be obtained with a minimum of parts and circuit elements, as well as of adjustments or controls.

In the example mentioned, that is, with the delay periods $T_1$, $T_2$ . . . , being equal and corresponding to the distance between the center lines of the signal pulses, the invention is especially suited for effecting cross-talk compensation in a pulse multiplex signaling systems and pulse code or the like transmission systems.

In FIG. 8, unilateral conducting devices, such as buffer amplifiers or the like, may be provided, to cause a current flow direction as indicated by the arrows *v* in the drawing. In addition, suitable polarity adjusting devices, represented by said amplifiers or the like, may be inserted in each of the feedback circuit aside from the attenuators $R_1$, $R_2$, $R_3$ . . . , to cause the compensating signals to be opposed in phase to the disturbing pulses to be reduced or eliminated.

As a consequence, where the frequency and/or phase distortion is of a more or less complex character such as to involve the production of two or more disturbing pulses occurring at intervals $T_0$ and varying in polarity as shown in FIG. 7*a* ($B_{n1}$ being of opposite polarity to $B_{n2}$), the individual polarity adjusting means provided in the various feedback or compensating circuits, such as in the form of buffer or unity gain amplifiers $V_1$, $V_2$, $V_3$ . . . , FIG. 9, will enable a practically complete compensation in a most simple and efficient manner. FIG. 9, being in general identical to FIG. 8, differs from the latter by the omission of the amplifier V in the main transmission circuit.

In FIGS. 8 and 9, it has been assumed that a primary signal pulse is followed, at intervals $T_0$, by four disturbing pulses, resulting thereby in four output coupling points of the compensator delay line H with the transit time from stage to stage of the line being equal to $T_0$. With specific reference to FIG. 9, the first and third disturbing pulses have been assumed of opposite polarity to the second and fourth disturbing pulses, resulting thereby in the adjustment or design of the amplifier output voltages as indicated by the plus and minus signs in the drawing.

Referring again to the prior art compensator according to the aforementioned U.S. patents, which may be considered as a feedforward in contrast to the feedback arrangement according to the instant application, a considerable number of delay networks or coupling points of the delay line are required as pointed out, to effect a full distortion compensation even in the case where the disturbing pulses happen to be all of the same polarity. On the other hand, where the polarity of the disturbing pulses varies, as shown in FIG. 7*a*, the difficulties may be multiplied such as to render practical distortion compensation impossible by the aid of simple and economical means. The present invention which automatically corrects the secondary or after effect pulses, without the requirement of additional delay networks or coupling points upon the compensator, is therefore of special significance in enabling a practical distortion compensation under the more common conditions of frequency and/or phase distortion by a transmission line, involving the production of disturbing pulses of both positive and negative polarity, in the manner shown in FIG. 7*a*. In more complex cases, the distorted or dispersed signal pulses, resembling a periodic signal wave, may contain a greater number of both positive and negative disturbing pulses, it being merely necessary in such a case to provide an equivalent number of delay networks or coupling points with associated attenuators and phase adjusting devices, in order to effect a practically full distortion compensation.

In the foregoing, compensation has been considered only in respect to the instantaneos signal values ($B_{n1}$, $B_{n2}$, etc.) co-inciding with the center lines of the primary pulse train $A_n$, $A_{n-1}$, $A_{n-2}$, etc., FIG. 7. Practically, however, the corrector operates to cause the disturbing signals to be zero at all times, especially where, in accordance with further feature of the invention, a sampling or gating technique is employed, as illustrated by the alternative embodiment of a distortion compensating system according to the invention and shown by FIGS. 10 and 11.

Figure 10:
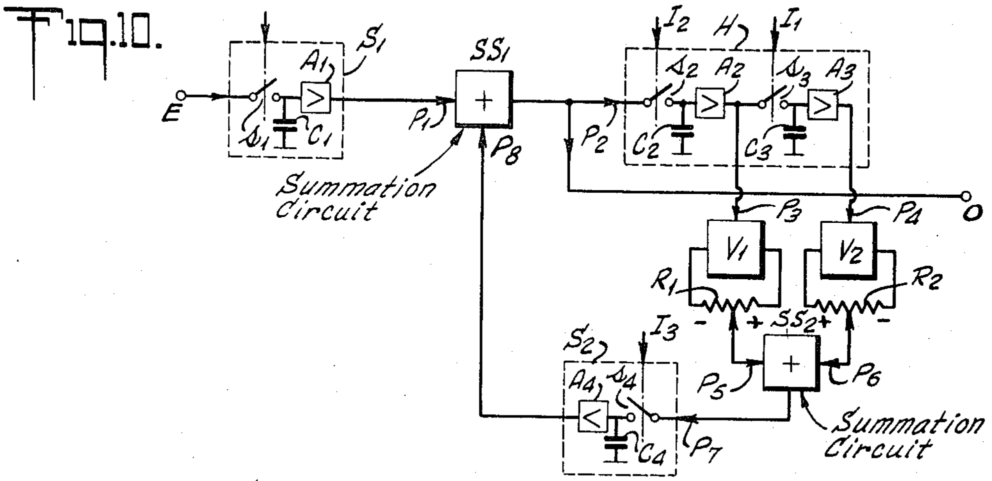
FIG. 10 is a circuit diagram in block form of still another embodiment of a distortion corrector according to the invention.

Referring more particularly to FIG. 10, the delay device H is of the discontinuous charge-transfer type, wherein the two sections, shown by way of example, to correct a signal according to FIG. 7*a*, each comprises a switch $s_2$ and $s_3$, a capacitor $C_2$ and $C_3$, and a buffer amplifier $A_2$ and $A_3$, respectively. The input signals are applied, via a sampling device $S_1$, comprised of a switch $s_1$, a capacitor $C_1$, and a buffer amplifier $A_1$, to one input of a summation circuit $SS_1$, the output of which is applied to the input of delay line H. The delayed pulses are applied in the previously described manner to the $R_1$ and $R_2$ attenuators and buffer amplifiers $V_1$ and $V_2$, respectively, the latter acting as polarity adjusting devices. The attenuated compensating pulses of proper polarity are in turn combined in the further summation device or circuit $SS_2$, the output of which is applied to a further sampling device $S_2$ similar to the device $S_1$ and comprising the switch $s_4$, capacitor $C_4$ and amplifier $A_4$. The output of $S_2$ is applied to the remaining input of the summation circuit $SS_1$. Switches $r_1$, $r_2$ and $r_3$ may be in the form of electronic gating devices, to sample the instantaneous signal ampplitudes, being sustained by the effect of the capacitors $C_1$, $C_2$ and $C_3$ acting as storage devices, respectively, the switches being controlled by clock pulse series $I_3$, $I_2$ and $I_1$, in the manner further described in the following. In other words, the switch $s_1$ and capacitor $C_1$ constitute an integrating device converting a received distorted pulse into consecutive constant-amplitude main and the distorting pulses of a length determined by the clock pulse intervals, as shown at $P_1$ in FIG. 11.

Figure 11:
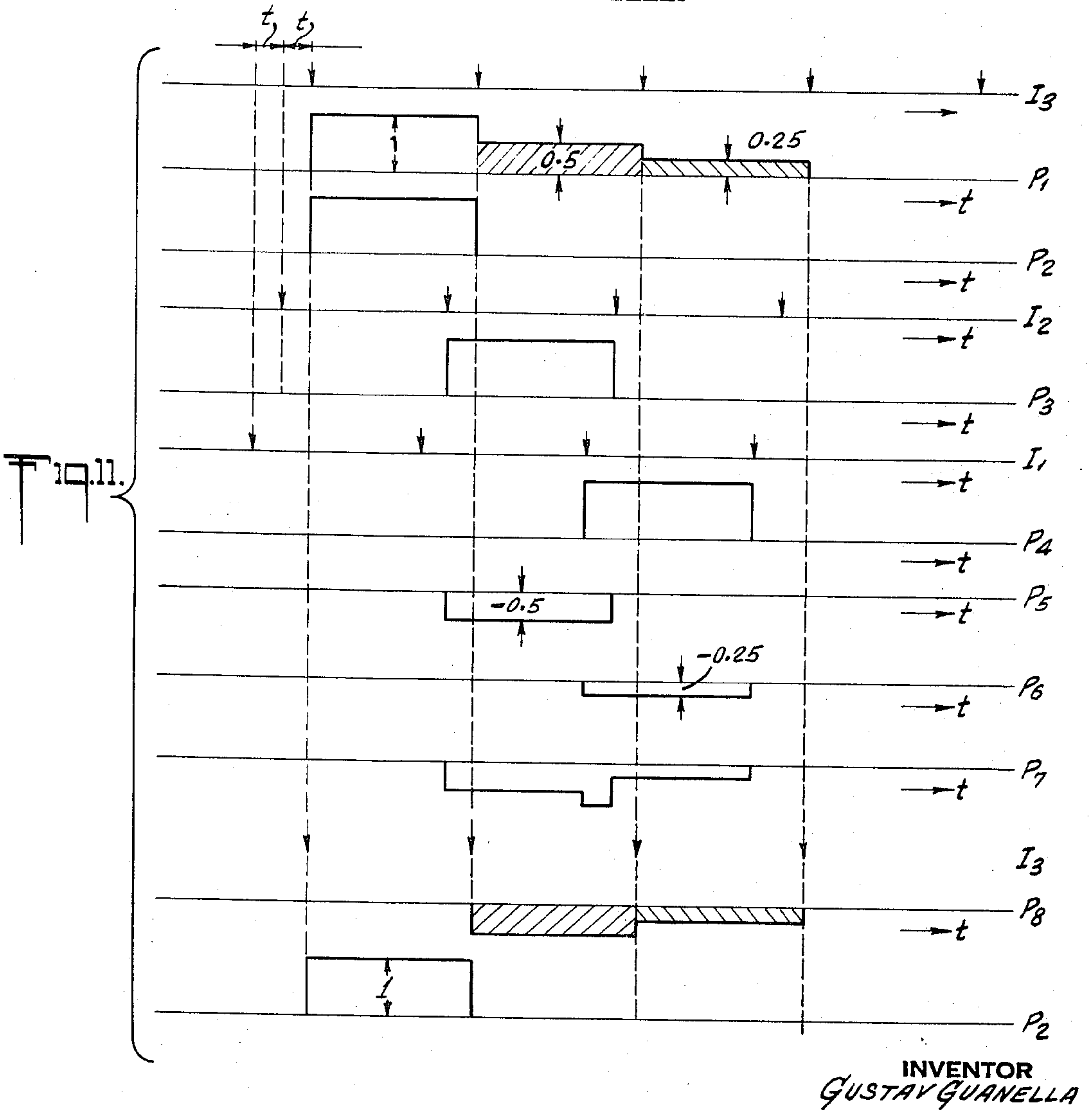
FIG. 11 shows a set of theoretical diagrams explanatory of the function and operation of the system according to FIG. 10.

In operation, a distorted input pulse signal, such as according to FIG. 7*a*, fed to the input E of the system is formed by the input sampling device $S_1$, having its switch $s_1$ controlled by a first clock pulse series $I_3$, FIG. 11, to produce an output signal $P_1$ consisting of a primary signal pulse of relative amplitude 1 and followed by two, in the example shown, disturbing or failure pulses of amplitudes 0.5 and 0.25, respectively, in the example illustrated. Pulses $P_1$ are fed, by way of the summation circuit $SS_1$, to both the output terminal O and to the input of the delay device H, each of the switches $s_2$ and $s_3$ of which are controlled by further clock pulse series $I_2$ and $I_3$, respectively, delayed relative to the clock pulses $I_3$ by time intervals $\tau$, whereby delayed pulses $P_3$ and $P_4$ are fed to the buffer amplifiers and polarity adjusting devices $V_1$ and $V_2$ and attenuators $R_1$ and $R_2$, to produce signals $P_5$ and $P_6$ which are applied to the inputs of the further summation device $SS_2$. The output signal $P_7$ of the latter forms, after sampling in $S_2$, whose switch $s_4$ is controlled by the clock pulse series $I_3$, the final compensating signal $P_8$ which is identical but of opposite polarity to the disturbing pulses of $P_1$, whereby to result in the cancellation of the distortion by combination in the summation device with the input signal $P_1$. With the switches $s_3$ and $s_2$ being controlled sequentially by the clock pulses $I_1$ and $I_2$, or from the right to the left, the input signal of the device travels from left to right by charge transfer, to result in a delay in the manner similar to a continuous delay line or device. For practical purposes, the time interval $\tau$ may be extremely small relative to the clock pulse spacing intervals corresponding to $T_0$.

The compensating devices heretofore described relate to communication signals transmitted in the form of pulses. Such compensating devices may be used, for example, in the transmission of pulses of constant width and constant spacing, in the transmission of keyed or constant amplitude variation, when transmitting amplitude modulated pulses, and also in time-multiplex transmission, as in the case of the above-mentioned prior patent. In all these cases, the difference in transit time for the pulses between two neighboring input or output coupling points may be made greater than the width of the input pulses and equal to the time interval between the centre lines of two successive signal pulses.

It is normally expedient to provide devices for compensating for distortion in the transmission of communication signals at the receiving end, since at this end of the transmission path it is easier to provide regulation by monitoring the output signals. If corresponding predistortion is provided at the transmitting end, the received signals appear already relieved of distortion. The predistortion may be regulated by temporarily forming a loop, including both the transmitter and receiver, provided that both directions of transmission of the loop exhibit identical distortion characteristics.

In brief, the device for compensating for distorton in the transmission of pulse signals according to the invention gives complete compensation if the transmission system can be simulated by a delay system. Little expenditure is involved of parts or circuits, since the delay device need not have any more stages than the simulation, and since there is no convergence problem of successive cancellations. The attenuation factors can be easily adjusted, especially if the corresponding factors of the simulattion are known, since each attenuation factor must correspond to that of the stimulation with opposite polarity. Adjustment can be carried out without difficulty even if the attenuation factors of the simulation are not known, since a change in one factor does not require any subsequent adjustment to the preceding factors on the delay line.

In the foreoing the invention has been described in reference to illustrative devices or systems. It will be evident, however, that variations and modifications, as well as the substitution of equivalent parts and circuits for those shown herein for illustration, may be made in accordance with the broader spirit and purview of the invention as defined in the appended claims. The specification and drawings are accordingly to be regarded in an illustrative rather than in a restrictive sense.

I claim:

1. In combination with a pulse signaling system including means to transmit a signal pulse series, having a constant spacing interval between the center lines of succeeding pulses, from a transmitting site to a receiving site over a transmission path subjecting the pulses to disperion due to frequency and/or phase distortion in the form of disturbing pulses following the main signal pulses, a distortion compensating system comprising in combination:

(1) a summation device having a first and a second input and an output, (2) means to insert said first input and said output in said path, (3) a time delay device having input and output terminals connected, respectively, to said output and said second input of said summation device, said time delay device having a total delay time equal to a whole number multiple of said pulse spaceing interval, (4) means including said input and said output terminals and at least one intermediate terminal of said delay device, to provide a plurality of feedback branch circuits shunting said delay device via said summation device and exteriorly of said path with the feedback pulses in said branch circuits being displaced by intervals equal to said pulse spacing interval, and (5) individual amplifiers and potentiometers inserted in each of said branch circuits, to adjust the amplitude and polarity of the feedback pulses, to substantially cancel the disturbing pulses in the output of said summation device.

2. In combination with a pulse signaling system including means to transmit a signal pulse series, having a constant spacing interval between the center lines of succeeding pulses, from a transmitting site to a receiving site over a transmission path subjecting the pulses to dispersion due to frequency and/or phase distrotion in the form of disturbing pulses following the main signal pulses, a distortion compensating system comprising in combination:

(1) a summation device having a first and a second input and an output, (2) means to insert said first input and said output in said path, (3) a time delay device having input and output terminals connected, respectively, to said output and said second input of said summation device, said time delay device having a total delay time equal to a whole number multiple of said pulse spacing interval, (4) means including said input and said output terminals and at least one intermediate terminal of said delay device, to provide a plurality of feedback branch circuits shunting said delay device via said summation device and exteriorly of said path with the feedback pulses in said branch circuits being displaced by intervals equal to said pulse spacing interval, (5) said branch circuits being connected, via said summation device, between said intermediate and output terminals, on the one hand, and the input connecting terminal of said delay device on the other hand, and (6) individual amplitude and polarity control means in each of said branch circuits, to adjust the amplitude and polarity of the feedback pulses, to substantially cancel the disturbing pulses in the output of said summation device.

3. A distortion compensating system as claimed in claim 1, including decoupling resistors in said feedback circuits in series with said potentiometers.

4. In combination with a pulse signaling system including means to transmit a signal pulse series from a transmitting site to a receiving site over a transmission path subjecting the pulses to dispersion due to frequency and/or phase distortion in the form of disturbing pulses following the main signal pulses, said signal pulse series having a constant spacing interval between the center lines of succeeding pulses corresponding to a predetermined clock frequency of said system, a distortion compensating system comprising in combination:

(1) a first summation device having a first and a second input, and an output, (2) a switching and integrating device operated at said clock frequency, to convert an incoming distorted pulse into a constant-amplitude main pulse followed by constant-amplitude disturbing pulses, (3) means connecting the first input of said summation device to the output of said switching device, (4) a multi-stage discontinous charge-transfer delay device including multiple switching and capacitor storage means operated at the clock frequency of said system and having its input connected to the output of said summation device, (5) a second summation device having a plurality of inputs and an output, (6) means connecting each of the stages of said delay device to an input of said second summation device, (7) means connecting the output of said second summation device to the second input of said first summation device, to provide a plurality of feedback circuits connecting the stages of said delay device with its input, via said first summation device, exteriorly of said transmission path, and (8) individual amplitude and polarity control means in each of said feedback circuits, to adjust the amplitude and polarity of the rsepctive feedback pulses, to substantially cancel the corresponding disturbing pulses in the output of said first summation device.

5. A distortion compensating system as claimed in claim 4, including a further switching device operated at the clock frequency and interposed between the output of said second summation device and the second input of said first summation device.

References Cited

UNITED STATES PATENTS

| | | | |
|---|---|---|---|
| 2,769,861 | 11/1956 | Black | 325—42 |
| 3,061,680 | 10/1962 | Frankel. | |
| 3,274,341 | 9/1966 | Allen | 179—15.55 |

RALPH D. BLAKESLEE, Primary Examiner

U.S. Cl. X.R.

328—55; 333—29